United States Patent
Ohuchi et al.

(10) Patent No.: US 7,337,667 B2
(45) Date of Patent: Mar. 4, 2008

(54) ANGULAR VELOCITY SENSOR AND ITS DESIGNING METHOD

(75) Inventors: Satoshi Ohuchi, Hyogo (JP); Hiroyuki Aizawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 287 days.

(21) Appl. No.: 10/542,933

(22) PCT Filed: Feb. 1, 2005

(86) PCT No.: PCT/JP2005/001374

§ 371 (c)(1),
(2), (4) Date: Jul. 21, 2005

(87) PCT Pub. No.: WO2005/078387

PCT Pub. Date: Aug. 25, 2005

(65) Prior Publication Data

US 2006/0150733 A1 Jul. 13, 2006

(30) Foreign Application Priority Data

Feb. 16, 2004 (JP) .............................. 2004-038253

(51) Int. Cl.
*G01P 9/04* (2006.01)
*H01L 41/08* (2006.01)

(52) U.S. Cl. .................................. 73/504.16; 310/370

(58) Field of Classification Search ............. 73/504.04, 73/504.12, 504.16, 504.02; 310/370
See application file for complete search history.

(56) References Cited

U.S. PATENT DOCUMENTS 3,683,213 A * 8/1972 Staudte ....................... 310/312
3,697,766 A * 10/1972 Ganter et al. ................ 310/348
4,498,025 A * 2/1985 Takahashi .................... 310/312

(Continued)

FOREIGN PATENT DOCUMENTS

JP 61-294311 12/1986

(Continued)

*Primary Examiner*—Helen Kwok
(74) *Attorney, Agent, or Firm*—Wenderoth, Lind & Ponack, L.L.P.

(57) ABSTRACT

An angular velocity sensor includes a tuning fork vibrator, a drive unit provided on the tuning folk vibrator, and a detection unit for detecting an amount of deflection of the tuning folk vibrator. The tuning fork vibrator includes a first vibrating arm having a first end and a second end and having a fundamental vibration frequency, a second vibrating arm having a first end and a second end and having the fundamental vibration frequency, and a coupling portion for coupling the first end of the first vibrating arm to the first end of the second vibrating arm. The drive unit is provided on the first vibrating arm and causes the first vibrating arm to vibrate. The drive unit has a driving resistance. The detection unit is provided on one of the first vibrating arm and the second vibrating arm, and detects an amount of deflection of the one of the first vibrating arm and the second vibrating arm when deflecting due to an angular velocity applied to the tuning fork vibrator. A ratio R1/R2 is smaller than "1", where R1 is the driving resistance at the fundamental vibration frequency, and R2 is the driving resistance at a vibration frequency different from the fundamental vibration frequency. This angular velocity sensor does not output unnecessary signals even if receiving disturbance.

11 Claims, 4 Drawing Sheets

U.S. PATENT DOCUMENTS

| | | | |
|---|---|---|---|
| 5,438,231 A | 8/1995 | Khoshnevisan et al. | |
| 5,996,410 A * | 12/1999 | Yachi et al. | 73/504.16 |
| 6,105,426 A * | 8/2000 | Yachi et al. | 73/504.16 |
| 6,253,613 B1 * | 7/2001 | Yachi et al. | 73/504.16 |
| 6,477,897 B1 * | 11/2002 | Mori | 73/504.12 |
| 6,477,987 B2 * | 11/2002 | Taylor | 119/843 |
| 7,002,284 B2 * | 2/2006 | Ouchi et al. | 310/370 |

FOREIGN PATENT DOCUMENTS

| | | |
|---|---|---|
| JP | 08-166244 | 6/1996 |
| JP | 10-221084 | 8/1998 |
| JP | 2000-292172 | * 10/2000 |
| JP | 2001-255152 | 9/2001 |
| JP | 2003-042768 | 2/2003 |
| JP | 2004-177367 | 6/2004 |
| WO | 03/052350 | 6/2003 |

* cited by examiner

ANGULAR VELOCITY SENSOR AND ITS DESIGNING METHOD

TECHNICAL FIELD

The present invention relates to an angular velocity sensor having a tuning fork vibrator, and a method for designing the sensor.

BACKGROUND OF THE INVENTION

In recent years, angular velocity sensors have been used in automobiles. The angular velocity sensors particularly for this purpose have been required to be small and stable against sudden external vibrations, "disturbance" so as to have high reliability.

A conventional angular velocity sensor disclosed in U.S. Pat. No. 5,438,231 includes a tuning fork vibrator having a pair of vibrating arms coupled with each other at their lower ends with a coupling portion, drive electrodes formed on the vibrating arms to drive the arms in vibration directions and detection electrodes to detect the bending of the vibrating arms when an angular velocity is applied to the arms. The vibrating arms are designed to have a small driving resistance so as to decrease power consumption.

The vibrating arms designed only for the small driving resistance may cause unnecessary vibrations when receiving vibrations as disturbance at their natural vibration frequencies different from a fundamental vibration frequency in the vibration directions. This may cause the angular velocity sensor to output an unnecessary signal.

SUMMARY OF THE INVENTION

An angular velocity sensor includes a tuning fork vibrator, a drive unit provided on the tuning folk vibrator, and a detection unit for detecting an amount of deflection of the tuning folk vibrator. The tuning fork vibrator includes a first vibrating arm having a first end and a second end and having a fundamental vibration frequency, a second vibrating arm having a first end and a second end and having the fundamental vibration frequency, and a coupling portion for coupling the first end of the first vibrating arm to the first end of the second vibrating arm. The drive unit is provided on the first vibrating arm and causes the first vibrating arm to vibrate. The drive unit has a driving resistance. The detection unit is provided on one of the first vibrating arm and the second vibrating arm, and detects an amount of deflection of the one of the first vibrating arm and the second vibrating arm when deflecting due to an angular velocity applied to the tuning fork vibrator. A ratio R1/R2 is smaller than "1", where R1 is the driving resistance at the fundamental vibration frequency, and R2 is the driving resistance at a vibration frequency different from the fundamental vibration frequency.

This angular velocity sensor does not output unnecessary signals even if receiving disturbance.

REFERENCE NUMERALS

1 Tuning Fork Vibrator
1a Vibrating Arm
1b Vibrating Arm
1c Coupling Portion
2 Drive Unit
3 Detection Unit

DETAILED DESCRIPTION OF PREFERRED EMBODIMENT

Figure 1A:
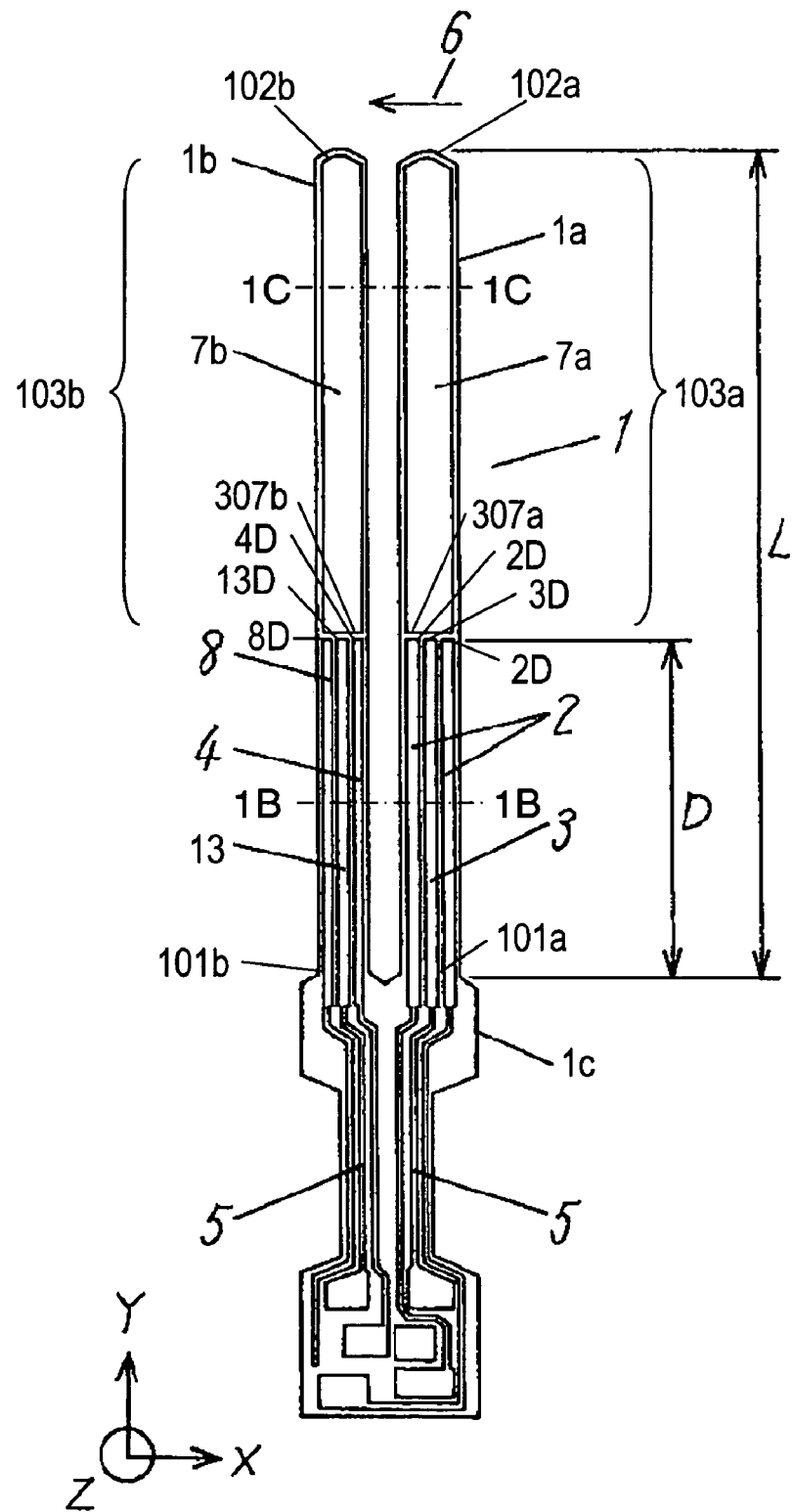
FIG. 1A is a front view of a tuning fork vibrator of an angular velocity sensor according to an exemplary embodiment of the present invention.

FIG. 1A is a front view of an angular velocity sensor according to an exemplary embodiment of the present invention. The angular velocity sensor includes tuning fork vibrator 1. Tuning fork vibrator 1 is made of a rigid material, such as silicon, and includes vibrating arms 1a and 1b which are parallel to each other, and coupling portion 1c for coupling lower end 101a of arm 1a to lower end 101b of arm 1b. Vibrating arm 1a has two drive units 2 formed thereon and has detection unit 3 formed between drive units 2. Vibrating arm 1b has detection unit 13 formed thereon and has monitor unit 4 and dummy electrode 8 which are parallel with detection unit 13.

Figure 1B:
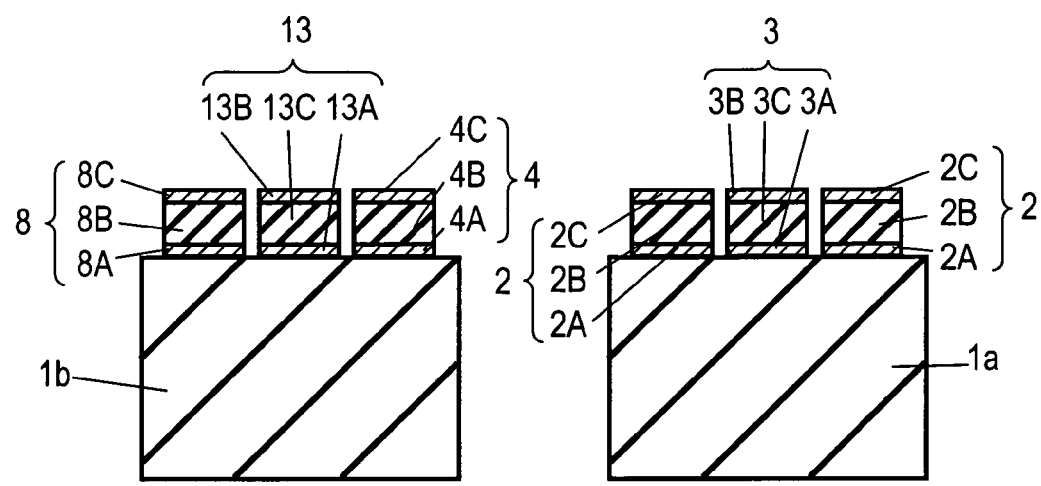
FIG. 1B is a cross sectional view of the angular velocity sensor at line 1B-1B shown in FIG. 1A.

FIG. 1B is a cross sectional view of the angular velocity sensor at line 1B-1B shown in FIG. 1A. Each of drive units 2 includes drive electrode 2A formed on vibrating arm 1a, piezoelectric layer 2B formed on drive electrode 2A, and drive electrode 2C formed on piezoelectric layer 2B. Drive units 2 extend in a direction from lower end 101a to upper end 102a of vibrating arm 1a. Detection unit 3 includes detection electrode 3A formed on vibrating arm 1a, piezoelectric layer 3C formed on detection electrode 3A, and detection electrode 3B formed on piezoelectric layer 3C. Detection electrode 3B extends in the direction from lower end 101a to upper end 102a of vibrating arm 1a. Detection electrode 3B has a length substantially equal to that of drive electrode 2C.

Detection unit 13 includes detection electrode 13A formed on vibrating arm 1b, piezoelectric layer 13C formed on detection electrode 13A, and detection electrode 13B formed on piezoelectric layer 13C. Monitor unit 4 includes monitor electrode 4A formed on vibrating arm 1b, piezoelectric layer 4B formed on monitor electrode 4A, and monitor electrode 4C formed on piezoelectric layer 4B. Dummy unit 8 includes dummy electrode 8A on vibrating arm 1b, piezoelectric unit 8B on dummy electrode 8A, and dummy electrode 8C on piezoelectric unit 8.

Coupling portion 1c has connection electrodes 5 formed thereon for connecting the electrodes of drive units 2, detection unit 3, and monitor unit 4 with outside.

A voltage is applied between drive electrodes 2A and 2C of drive units 2 which causes vibrating arm 1a to vibrate in X-axis direction 6, thereby causing vibrating arm 1b to resonate with this vibration and to vibrate at the same frequency as vibrating arm 1a. Monitor electrodes 4A and 4C of monitor unit 4 output signals corresponding to the amplitudes of the vibrations of vibrating arms 1a and 1b. These signals are fed back to a control circuit which controls the driving voltage to be applied to drive electrodes 2A and 2C. Based on the signals which are fed back, the control circuit controls the frequencies, voltages, and phases of the signals to be applied to drive electrodes 2A and 2C so as to maintain the vibration of vibrator 1. Vibrating arm 1a deflects in the Z-axis direction due to a Coriolis force produced by an angular velocity applied to vibrator 1 around the Y axis, and detection electrodes 3A and 3B of detection unit 3 accordingly output a signal indicating the amount of the deflection of vibrating arm 1a which corresponds to the Coriolis force. Similarly to this, vibrating arm 1b deflects in the Z-axis direction due to a Coriolis force produced by the angular velocity applied to vibrator 1 around the Y axis, and detection electrodes 13A and 13B of detection unit 13 accordingly output a signal indicating the amount of the deflection of vibrating arm 1b which corresponds to the Coriolis force.

The angular velocity sensor has driving resistance Rd, a transfer impedance in driving vibrator 1. Driving resistance Rd is defined as the ratio Vd/Im of voltage Vd applied between drive electrodes 2A and 2C to current Im generated in monitor electrodes 4A and 4C due to the vibration of vibrator 1. In the angular velocity sensor of the embodiment, vibrating arms 1a and 1b of tuning fork vibrator 1 and drive units 2 are designed based on the ratio R1/R2 of value R1 of driving resistance Rd at a fundamental vibration frequency of vibrating arms 1a and 1b in vibration direction 6 to value R2 of driving resistance Rd at a disturbance vibration frequency different from the fundamental vibration frequency. That is, in designing the angular velocity sensor, the sizes of vibrating arms 1a and 1b and drive units 2 are determined based on the ratio R1/R2.

Figure 2:
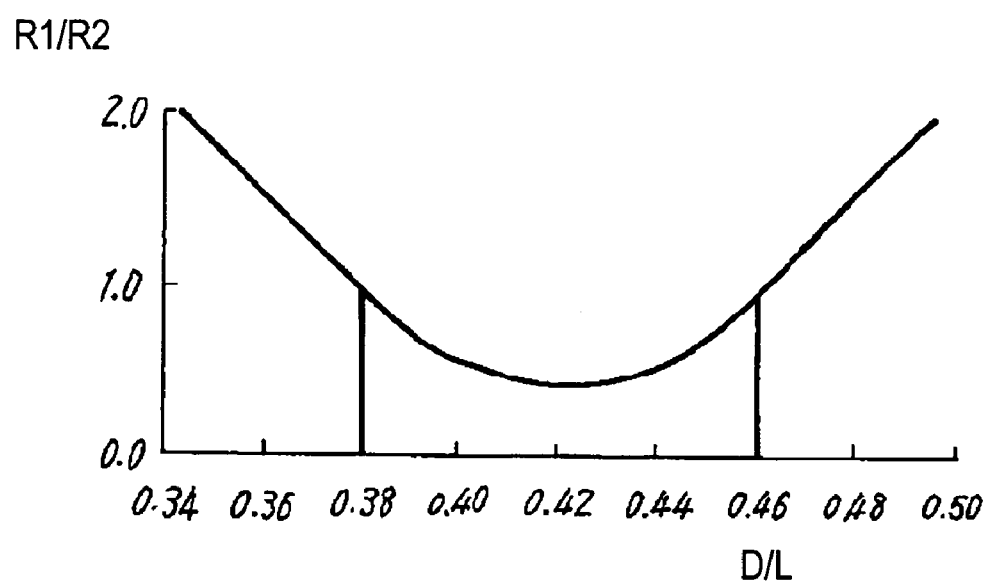
FIG. 2 shows a driving resistance and a size of an electrode of the angular velocity sensor according to the embodiment.

FIG. 2 shows the relation between the ratio D/L (represented by the horizontal axis) of length D of each of drive electrodes 2A and 2C to length L of each of vibrating arms 1a and 1b, and the ratio R1/R2 (represented by the vertical axis) of driving resistances Rd. As shown in FIG. 2, the relation between these ratios is similar to a quadratic curve having a minimum value.

Figure 3:
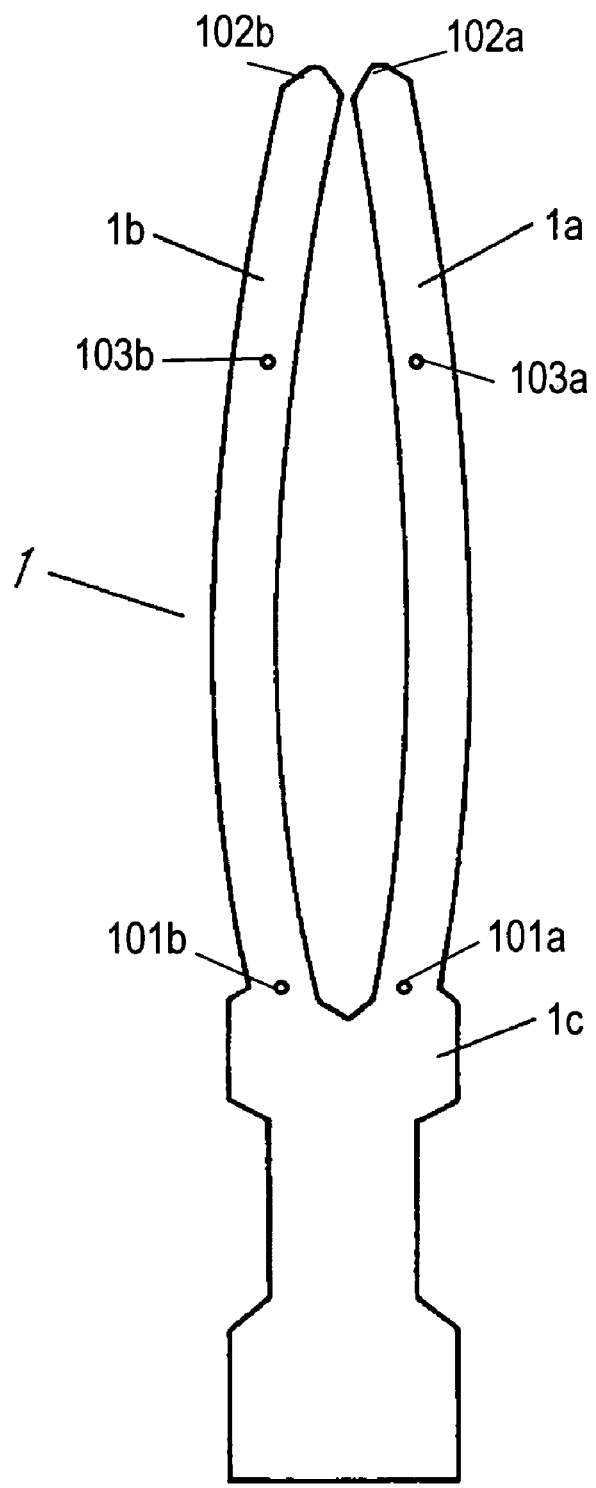
FIG. 3 shows a vibration due to disturbance on the tuning fork vibrator of the angular velocity sensor according to the embodiment.

Vibrating arms 1a and 1b vibrate at natural vibration frequencies in different modes. At the fundamental vibration frequency of value R1 of driving resistance Rd, the vibration has only one node positioned at lower end 101a. FIG. 3 shows the vibration acting on the tuning fork vibrator according to the embodiment at a disturbance vibration frequency corresponding to value R2 of the driving resistance, which has been mentioned above. Value R2 of the driving resistance corresponds to the vibration at a frequency that may cause vibrating arms 1a and 1b to bend at an intermittent point in direction 6, out of the natural vibration frequencies of vibrating arms 1a and 1b. More specifically, the vibration on vibrating arm 1a has nodes at lower end 101a of vibrating arm 1a and at point 103a between lower end 101a and upper end 102a of vibrating arm 1a at the disturbance frequency of value R2 of the driving resistance, while the vibration on vibrating arm 1b has nodes at lower end 101b of vibrating arm 1b and at point 103b between lower end 101b and upper end 102b of vibrating arm 1b. The vibration at the disturbance frequency may often occur fewer than the vibration at the fundamental vibration frequency. This mode of the vibration at the disturbance frequency may be taken into consideration for designing the angular velocity sensor in addition to other modes, such as a mode in which both vibrating arms 1a and 1b vibrate in the X-axis direction and a mode in which both arms 1a and 1b vibrate in the Z-axis direction, so as to improve the reliability of the angular velocity sensor.

The ratio R1/R2 is determined to be less than "1" so that vibrating arms 1a and 1b are less affected by disturbance. Therefore, in order to prevent the vibration shown in FIG. 3, the ratio R1/R2 is determined to be less than "1" based on FIG. 2 by determining the ratio D/L so as to satisfy the relation of 0.38<D/L<0.46.

In the above description, attention is paid to the relation between lengths D of drive electrodes 2A and 2C and length L of vibrating arm 1a. Similarly, lengths D of detection electrodes 3A and 3B may be determined to be 0.38<D/L<0.46.

Auxiliary weight unit 7a is preferably provided on portion 103a of vibrating arm 1a where drive units 2 or detection unit 3 is not formed thereon. Similarly, auxiliary weight unit 7b is preferably provided on portion 103b of vibrating arm 1b where monitor unit 4, detection unit 13, or dummy unit 8 is not formed thereon. The electrodes provided on vibrating arms 1a and 1b are provided by forming a base electrode on the entire surface of a silicon substrate providing tuning fork vibrator 1, and then, the base electrode is etched so as to remove an unnecessary portion thereof. This etching may damage a surface of the silicon substrate, thereby changing properties of the angular velocity sensor. However, auxiliary weight units 7a and 7b reduce an exposing surface of vibrating arms 1a and 1b, thereby preventing the properties of the angular velocity sensor from changing. The same unit may be applied to the etching of the piezoelectric layers.

Figure 1C:
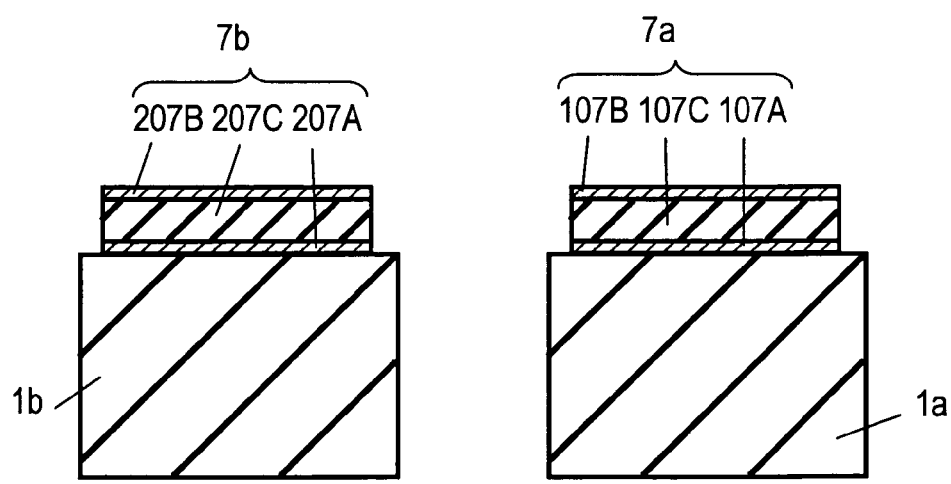
FIG. 1C is a cross sectional view of the angular velocity sensor at line 1C-1C shown in FIG. 1A.

FIG. 1C is a cross sectional view of the angular velocity sensor at line 1C-1C shown in FIG. 1A. Similar to drive units 2 and detection unit 3, auxiliary weight unit 7a formed on vibrating arm 1a includes electrode 107A formed on vibrating arm 1a, piezoelectric layer 107C formed on electrode 107a, and electrode 107B formed on piezoelectric layer 107C. Similar to monitor unit 4 and detection unit 13, auxiliary weight unit 7b formed on vibrating arm 1b includes electrode 207A formed on vibrating arm 1b, piezoelectric layer 207C formed on electrode 207a, and electrode 207B formed on piezoelectric layer 207C. Auxiliary weight units 7a and 7b have the same structure as drive units 2, detection unit 3, monitor unit 4, and detection unit 13, thereby allowing all of these units to be formed simultaneously without any additional process. Auxiliary weight unit 7a is separate from drive units 2 and detection unit 3, while auxiliary weight unit 7b is separate from monitor unit 4, detection unit 13, and dummy unit 8.

Detection electrode 3B of detection unit 3 may have a length equal to that of drive electrode 2C of drive units 2 so as to align end surface 3D with end surface 2D. This allows end surface 307a of auxiliary weight unit 7a facing end surfaces 3D and 2D to be straight, thereby decreasing the exposing surface of vibrating arm 1a. Similarly, detection electrode 13B of detection unit 13 may have a length equal to that of monitor electrode 4C of monitor unit 4 and that of electrode 8C of dummy unit 8 so as to align end surface 13D with end surfaces 4D and 8D, so that end surface 307b of auxiliary weight unit 7b facing end surfaces 13D, 4D, and 8D can be straight, thereby decreasing the exposing surface of vibrating arm 1b.

Auxiliary weight units 7a and 7b lower the fundamental vibration frequencies of vibrating arms 1a and 1b. Vibrating arms 1a and 1b may be preferably shorter or wider in order to obtain a predetermined fundamental vibration frequency. That is, auxiliary weight units 7a and 7b, providing the predetermined fundamental vibration frequency, allow vibrating arms 1a and 1b to be short, thereby reducing the size of the angular velocity sensor, or allows arms 1a and 1b to be wide, thereby increasing the areas of drive units 2 and detection unit 3 formed thereon and improving the efficiencies in driving and detection.

The shape of auxiliary weight unit 7a may be adjusted by trimming with a laser so as to control the weights or the centers of gravity of vibrating arms 1a and 1b. This operation accordingly controls a vibration frequency and a vibration direction, thereby providing a precise angular velocity sensor generating less noise.

In the vibrator 1 according to the present embodiment, drive units 2 are formed exclusively on vibrating arm 1a of the two vibrating arms 1a and 2b, thereby exclusively driving vibrating arm 1a. Vibrating arm 1b may preferably have a structure symmetrical to that of vibrating arm 1a in order to have the same resonance frequency as vibrating arm 1a. Dummy unit 8 provides vibrating arm 1b with a structure symmetrical to that of vibrating arm 1a.

In the angular velocity sensor according to the present embodiment, drive units 2 exclusively drive vibrating arm 1a. However, vibrating arm 1b may be driven together with vibrating arm 1a by at least one of dummy unit 8 and the monitor unit, which have the same structure as drive units 2.

In the angular velocity sensor according to the present embodiment, the length of drive electrode 2A at the uppermost position in drive unit 2 is determined based on the length of vibrating arm 1a. Piezoelectric layer 2B and drive electrode 2C may have lengths equal to or greater than drive electrode 2A. Only a region in piezoelectric layer 2B of drive unit 2 on which drive electrode 2A is formed and to which a voltage is applied contributes to the driving. Therefore, the length of drive electrode 2A at the uppermost position determines an effective area of piezoelectric member 2B so as to obtain desired properties.

INDUSTRIAL APPLICABILITY

An angular velocity sensor according to the present invention reduces noise due to disturbance, and hence is useful for cases in which the sensor is mounted on vibrating bodies, such as automobiles.

The invention claimed is:

1. An angular velocity sensor comprising:
    a tuning fork vibrator including
        a first vibrating arm having a first end and a second end, the first vibrating arm having a fundamental vibration frequency,
        a second vibrating arm having a first end and a second end, the second vibrating arm having the fundamental vibration frequency, and
        a coupling portion for coupling the first end of the first vibrating arm to the first end of the second vibrating arm;
    a drive unit for causing the first vibrating arm to vibrate, the drive unit being provided on the first vibrating arm, the drive unit having a driving resistance;
    a detection unit for detecting an amount of deflection of one of the first vibrating arm and the second vibrating arm when deflecting due to an angular velocity applied to the tuning fork vibrator, the detection unit being provided on the one of the first vibrating arm and the second vibrating arm; and
    an auxiliary weight unit provided on the first vibrating arm and between the drive unit and the second end of the first vibrating arm, the auxiliary weight unit being separated from the drive unit and the detection unit, wherein the auxiliary weight unit includes
        a first electrode provided on the first vibrating arm,
        a piezoelectric layer provided on the first electrode, and
        a second electrode provided on the piezoelectric layer,
    and wherein a ratio R1/R2 is smaller than "1", where R1 is the driving resistance at the fundamental vibration frequency, and R2 is the driving resistance at a vibration frequency different from the fundamental vibration frequency.

2. The angular velocity sensor according to claim 1, wherein the first vibrating arm has nodes at the first end of the first vibrating arm and at a point between the first end and the second end of the first vibrating arm when the first vibrating arm vibrates at the frequency different from the fundamental vibration frequency.

3. The angular velocity sensor according to claim 1, wherein the drive unit includes
    a first electrode provided on the first vibrating arm from the first end of the first vibrating arm toward the second end of the first vibrating arm,
    a piezoelectric layer provided on the first electrode from the first end of the first vibrating arm toward the second end of the first vibrating arm, and
    a second electrode provided on the piezoelectric layer from the first end of the first vibrating arm toward the second end of the first vibrating arm, the second electrode having a length (D) in a direction from the first end of the first vibrating arm toward the second end of the first vibrating arm, wherein the first vibrating arm has a length (L) from the first end thereof to the second end thereof, and wherein the length (D) and the length (L) satisfy a relation of $0.38 < D/L < 0.46$.

4. The angular velocity sensor according to claim 1, wherein the detection unit includes
    a first electrode provided on the one of the first vibrating arm and the second vibrating arm from the first end of the one of the first vibrating arm and the second vibrating arm toward the second end of the one of the first vibrating arm and the second vibrating arm,
    a piezoelectric layer provided on the first electrode from the first end of the one of the first vibrating arm and the second vibrating arm toward the second end of the one of the first vibrating arm and the second vibrating arm, and
    a second electrode provided on the piezoelectric layer from the first end of the one of the first vibrating arm and the second vibrating arm toward the second end of the one of the first vibrating arm and the second vibrating arm, the second electrode having a length (D) in a direction from the first end of the one of the first vibrating arm and the second vibrating arm toward the second end of the one of the first vibrating arm and the second vibrating arm, wherein the one of the first vibrating arm and the second vibrating arm has a length (L) from the first end thereof to the second end thereof, and wherein the length (D) and the length (L) satisfy a relation of $0.38 < D/L < 0.46$.

5. The angular velocity sensor of claim 1, wherein the auxiliary weight unit has a shape which can be adjusted to control vibration directions of the first vibrating arm and the second vibrating arm.

6. A method for designing an angular velocity sensor which includes
    a tuning fork vibrator including
        a first vibrating arm having a first end and a second end, and having a fundamental vibration frequency,
        a second vibrating arm having a first end and a second end, and having the fundamental vibration frequency, and a coupling portion for coupling the first end of the first vibrating arm to the first end of the second vibrating arm, a drive unit for causing the first vibrating arm to vibrate, the drive unit being provided on the first vibrating arm, the drive unit having a driving resistance, a detection unit for detecting an amount of deflection of one of the first vibrating arm and the second vibrating arm when deflecting due to an angular velocity applied to the tuning fork vibrator, the detection unit being provided on the one of the first vibrating arm and the second vibrating arm, and an auxiliary weight unit provided on the first vibrating arm and between the drive unit and the second end of the first vibrating arm, the auxiliary weight unit being separated from the drive unit and the detection unit, wherein the auxiliary weight unit includes a first electrode provided on the first vibrating arm, a piezoelectric layer provided on the first electrode, and a second electrode provided on the piezoelectric layer the method comprising:

determining a size of the first vibrating arm; and determining a size of the drive unit so that a ratio R1/R2 is smaller than "1", where R1 is the driving resistance at the fundamental vibration frequency, and R2 is the driving resistance at a frequency different from the fundamental vibration frequency.

7. The method according to claim 6, wherein the first vibrating arm has nodes at the first end of the first vibrating arm and at a point between the first end and the second end of the first vibrating arm when the first vibrating arm vibrates at the frequency different from the fundamental vibration frequency.

8. The method according to claim 6,
wherein the drive unit includes
a first electrode provided on the first vibrating arm from the first end of the first vibrating arm toward the second end of the first vibrating arm,
a piezoelectric layer provided on the first electrode from the first end of the first vibrating arm to the second end of the first vibrating arm, and
a second electrode provided on the piezoelectric layer from the first end of the first vibrating arm to the second end of the first vibrating arm, the second electrode having a length (D) in a direction from the first end of the first vibrating arm to the second end of the first vibrating arm,
wherein the first vibrating arm has a length (L) from the first end thereof to the second end thereof, and
wherein said determining of the size of the drive unit comprises determining the length D of the drive unit so as to satisfy a relation of $0.38 < D/L < 0.46$.

9. The angular velocity sensor according to claim 3, wherein the first electrode, the piezoelectric layer and the second electrode of the auxiliary weight unit have a same structure as that of the first electrode, the piezoelectric layer and the second electrode of the drive unit, respectively.

10. The angular velocity sensor according to claim 4, wherein the first electrode, the piezoelectric layer and the second electrode of the auxiliary weight unit have a same structure as that of the first electrode, the piezoelectric layer and the second electrode of the detection unit, respectively.

11. The method according to claim 8, wherein the first electrode, the piezoelectric layer and the second electrode of the auxiliary weight unit have a same structure as that of the first electrode, the piezoelectric layer and the second electrode of the drive unit, respectively.

* * * * *